United States Patent
Imagawa et al.

(10) Patent No.: US 10,851,545 B2
(45) Date of Patent: Dec. 1, 2020

(54) CONCRETE TILE AND MOLDING MATERIAL FOR SAME

(71) Applicant: Kuraray Co., Ltd., Kurashiki (JP)

(72) Inventors: Akira Imagawa, Okayama (JP);
Shinya Inada, Okayama (JP);
Yoshihiro Iwasaki, Osaka (JP); Saburo Hada, Tsurugashima (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 15/141,232

(22) Filed: Apr. 28, 2016

(65) Prior Publication Data

US 2016/0237686 A1 Aug. 18, 2016

Related U.S. Application Data

(63) Continuation of application No. PCT/JP2014/079179, filed on Nov. 4, 2014.

(30) Foreign Application Priority Data

Nov. 6, 2013 (JP) .................................. 2013-230576

(51) Int. Cl.
*E04D 3/26* (2006.01)
*B28B 11/16* (2006.01)
(Continued)

(52) U.S. Cl.
CPC .................. *E04D 3/26* (2013.01); *B28B 1/52* (2013.01); *B28B 3/123* (2013.01); *B28B 5/028* (2013.01);
(Continued)

(58) Field of Classification Search
None
See application file for complete search history.

(56) References Cited

U.S. PATENT DOCUMENTS

| 4,673,659 A | 6/1987 | Wood et al. |
| 5,106,557 A | 4/1992 | Rirsch et al. |

(Continued)

FOREIGN PATENT DOCUMENTS

| EP | 0 295 153 A1 | 12/1988 |
| GB | 2 163 421 A | 2/1986 |

(Continued)

OTHER PUBLICATIONS

International Preliminary Report on Patentability and Written Opinion dated May 19, 2016 in PCT/JP2014/079179 (submitting English language translation only).
Extended European Search Report dated Jul. 7, 2017 in European Patent Application No. 14860813.6.
Australian Office Action dated Aug. 24, 2017 in Australian Patent Application No. 2014344915.
(Continued)

*Primary Examiner* — Laura C Powers
(74) *Attorney, Agent, or Firm* — Oblon, McClelland, Maier & Neustadt, L.L.P.

(57) ABSTRACT

A concrete tile comprising a tile body, the tile body having an upper face hardened through non-mold shaping, a lower face hardened through mold shaping, and a side surface that includes a cut end face in at least one side of the tile body, wherein the tile body contains alkali-resistant fiber in an entire thickness thereof in a state substantially free of fiber-containing granular bodies; the alkali-resistant fibers comprise at least one member selected from the group consisting of polyvinyl alcohol-based fibers, polyethylene fibers, polypropylene fibers, acrylic fibers, and aramid fibers; and a flexural strength of a 30 mm×150 mm sized cut piece of the tile body is not less than 6 N/mm².

17 Claims, 2 Drawing Sheets

(51) Int. Cl.

| | | |
|---|---|---|
| *C04B 28/02* | (2006.01) | |
| *E04D 1/04* | (2006.01) | |
| *B28B 1/52* | (2006.01) | |
| *B28B 5/02* | (2006.01) | |
| *C04B 16/06* | (2006.01) | |
| *E04D 1/16* | (2006.01) | |
| *B28B 3/12* | (2006.01) | |
| *C04B 111/00* | (2006.01) | |
| *C04B 111/20* | (2006.01) | |

(52) U.S. Cl.
CPC .......... *B28B 11/16* (2013.01); *C04B 16/0633* (2013.01); *C04B 16/0641* (2013.01); *C04B 28/02* (2013.01); *E04D 1/04* (2013.01); *E04D 1/16* (2013.01); *C04B 2111/00129* (2013.01); *C04B 2111/00594* (2013.01); *C04B 2111/2023* (2013.01)

(56) References Cited

U.S. PATENT DOCUMENTS

| | | | |
|---|---|---|---|
| 5,108,679 A | | 4/1992 | Rirsch et al. |
| 6,071,448 A | * | 6/2000 | Oberoi ................ B28B 5/028 264/145 |

FOREIGN PATENT DOCUMENTS

| | | |
|---|---|---|
| GB | 2 220 934 A | 1/1990 |
| JP | 61-91080 | 5/1986 |
| JP | 1-242446 | 9/1989 |
| JP | 1-242446 A | 9/1989 |
| JP | 2-84303 | 3/1990 |
| JP | 4-179502 | 6/1992 |
| JP | 5-318433 | 12/1993 |
| JP | 5-318434 | 12/1993 |
| JP | 2002-361620 A | 12/2002 |
| JP | 2017-7905 | 1/2017 |

OTHER PUBLICATIONS

International Search Report dated Feb. 3, 2015 in PCT/JP2014/079179, filed Nov. 4, 2014 (with English Translation).
Japanese Office Acton dated Aug. 28, 2018 in Japanese Patent Application No. 2018-546638 (with unedited computer generated English translation), 7 pages.
Australian Examination Report No. 1 dated Jul. 13, 2018 in corresponding Australian Patent Application No. 2018204490, 4 pages.
Substantive Examination Report Stage I dated Jan. 23, 2019 in Indonesian Patent Application No. P00201603198 (with Computer Generated English Translation).
Notice of Dispatch of Duplicates of Written Opposition dated Oct. 10, 2019 in Japanese Application No. 2015-546638 (with Computer Generated English Translation).
Notice of Reasons for Revocation dated Dec. 10, 2019 in Japanese Application No. 2015-546638 (with Computer Generated English Translation).
"Concrete Handbook (Second Edition)", Japan Concrete Institute, Gihodo Shuppan Co., Ltd., Feb. 15. 1996, 7 pages (with Computer Generated English Translation).
Kazusuke Kobayashi "Fiber Reinforced Concrete", Concrete Journal, vol. 13, No. 8, Aug. 1975, 17 pages (with Computer Generated English Translation).
Shigeyuki Akihama "Fiber Reinforced Concrete—with a Focus on New Material Fibers", Kajima Institute Publishing Co., Ltd., Mar. 10, 1992, 6 pages (with Computer Generated English Translation).
Office Action published in Brazilian Industrial Property Journal No. 2571 of Apr. 14, 2020, on Brazilian patent application No. 1120160098439, w/ partial English translation (6 pages).
Notice of Reasons for Revocation dated Jul. 6, 2020, on Corresponding Japanese patent Application No. 2019-700740 (with Machine English Translation).
Office Action dated Jun. 29, 2020, in Vietnamese patent application No. 1-2016-02026, w/ English translation ( 2 pages).
Office Action dated Aug. 14, 2020, in Mexican patent appiication No. MX/a/2016/005701, w/ English translation (7 pages).

* cited by examiner

CONCRETE TILE AND MOLDING MATERIAL FOR SAME

CROSS REFERENCE TO THE RELATED APPLICATION

This application is a continuation application, under 35 U.S.C. § 111(a), of international application No. PCT/JP2014/079179, filed Nov. 4, 2014, which claims priority to Japanese patent application No. 2013-230576, filed Nov. 6, 2013, the entire disclosure of which is herein incorporated by reference as a part of this application.

BACKGROUND OF THE INVENTION

Field of the Invention

The present invention relates to a concrete tile manufactured by an extrusion molding method (roller/slipper system), and relates to a molding material for manufacturing the concrete tile.

Description of Related Art

Concrete tiles obtained by a roller/slipper method are cost-effective, and are frequently used worldwide. For example, Japanese Laid-Open Patent Publication No. S61-91080 has disclosed a method for manufacturing a light-weight concrete tile by the roller/slipper method. Japanese Laid-Open Patent Publication No. S61-91080 describes that a concrete roof tile is manufactured by a roller/slipper method, where a tile molding material composed of a mixture of cement, sand, and water is compressed on a moving pallet, firstly by a roller, and secondary by a slipper.

In more detail, this document indicates that a non-thixotropic silica fume and a silica fume dispersing agent are applied to the tile molding material to form a reaction product of the non-thixotropic silica fume and lime.

Japanese Laid-Open Patent Publication No. H4-179502 discloses a light-weight concrete plate tile obtained by laminating a fiber-mixed layer formed from a mortar that contains fibers mixed therein and a fiber-free mortar layer.

SUMMARY OF THE INVENTION

In general, a concrete tile is required to have a light weight where it is used as a roof tile. On the other hand, a concrete tile that satisfies the light weight requirement has a problem in strength. Although Japanese Laid-Open Patent Publication No. S61-91080 intends to improve the strength by the use of silica fume, it is difficult to sufficiently increase the strength of the concrete tile with very fine particles of silica fume.

On the other hand, according to Japanese Laid-Open Patent Publication No. H4-179502, a roof tile is partially provided with a layer containing fibers mixed therein in order to reduce the weight while maintaining the strength. However, the tile of Japanese Laid-Open Patent Publication No. H4-179502 still includes a fiber-free mortar layer, and thus, is not sufficiently strong. Further, with a two-layer structure composed of a fiber-mixed layer and a mortar layer, it is impossible to reduce the total thickness of the tile, resulting in inferior reduction of weight and thickness.

An object of the present invention is to provide a concrete tile having satisfactory strength and light weight, wherein the tile includes fibers in its entire body in a state free of fiber-containing granular bodies.

Another object of the present invention is to provide a molding material capable of forming a concrete tile having the above-described features.

Still another object of the present invention is to provide a method for manufacturing a concrete tile by using such a molding material.

As a result of extensive research to achieve the above described objects, the inventors of the present invention have found the following.

Where a specific alkali-resistant organic fibers are used as reinforcing fibers included in the concrete tile, and the fibers can be dispersed in the concrete tile in a state substantially free of fiber-containing granular bodies, it is possible to enhance the strength of the concrete tile while reducing weight of the tile even where a concrete tile is manufactured by the roller/slipper method. As a result of these findings, the inventors invented the present invention.

A first configuration of the present invention is a concrete tile that includes a tile body having:
   an upper face hardened through non-mold shaping;
   a lower face hardened through mold shaping; and
   a side surface that includes a cut end face in at least one side of the tile,
   wherein alkali-resistant fibers are dispersed in the entire thickness of the tile body in a state substantially free of a fiber-containing granular body;
   the fibers are composed of at least one selected from the group consisting of polyvinyl alcohol-based fibers, polyethylene fibers, polypropylene fibers, acrylic fibers, and aramid fibers; and
   flexural strength of a 30 mm×150 mm sized cut piece of the tile body is not less than 6 N/mm$^2$.

In the concrete tile, a specific gravity of the tile body may be about 1.5 to 2.2. Preferably, a surface of the tile body substantially does not have a protrusion due to the presence of fiber-containing granular body.

An average diameter of the alkali-resistant fibers may be 1 to 200 μm. An aspect ratio of each of the alkali-resistant fibers may be 50 to 1000. In particular, the alkali-resistant fibers may be polyvinyl alcohol fibers.

Preferably, the concrete tile passes EN490 standard of a tile bending test performed in accordance with EN491:2011. Preferably, the concrete tile is not substantially split-broken in a falling ball test performed according to JIS A 1408.

A second configuration of the present invention is a molding material for manufacturing the concrete tile.

The molding material includes at least a cement, a fine aggregate, an alkali-resistant fibers, and water,
   wherein a water cement ratio (W/C) of the molding material is 20 to 50% by mass;
   the alkali-resistant fibers are composed of at least one selected from the group consisting of polyvinyl alcohol fibers, polyethylene fibers, polypropylene fibers, acrylic fibers, and aramid fibers;
   a proportion of the alkali-resistant fibers in a solid content is 0.1 to 2% by mass; and
   the molding material is substantially free of a fiber-containing granular body containing the alkali-resistant fibers.

The molding material may further include a functional aggregate.

The aspect ratio of the alkali-resistant fiber may be about 50 to 1000. The average fiber diameter of the alkali-resistant fiber may be about 1 to 200 μm.

Further, a third configuration of the present invention also encompasses use of the alkali-resistant fiber used in manufacture of the concrete tile, i.e., the use of alkali-resistant fibers composed of at least one selected from the group consisting of polyvinyl alcohol-based fibers, polyethylene fibers, polypropylene fibers, acrylic fibers, and aramid fibers for manufacturing the concrete tile.

Still further, a fourth configuration of the present invention encompasses manufacturing method of a concrete tile through a roller/slipper method.

The manufacturing method includes:

supplying the above-described molding material to a hopper of a roller/slipper-type extruder;

filling the molding material supplied from a lower portion of the hopper into a plurality of pallets adjacent to each other;

compressing the filled molding material by using a roller and a slipper, and thereby forming a continuous band-shaped body on the pallets adjacent to each other; and cutting the band-shaped body with a cutting blade to form individual raw tiles on individual pallets.

In the above-described manufacturing method, the supplying of the molding material may include a preparation of the molding material, and the preparation may include dispersing the alkali-resistant fiber in a mixture including a cement, an aggregate, and water, such that the mixture is substantially free of a fiber-containing granular body containing the alkali-resistant fibers.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

According to the present invention, the alkali-resistant fibers are dispersed in a specific state to be included in the entire portion of the concrete tile manufactured through the roller/slipper method, whereby high strength and light weight of the concrete tile can be achieved.

In addition, in the present invention, a concrete tile which is light in weight and excellent in strength can be manufactured by using the specific molding material.

BRIEF DESCRIPTION OF THE DRAWINGS

The present invention will be more clearly understood from the following description of preferred embodiments, when taken in conjunction with the accompanying drawings. However, the embodiments and the drawings are given only for the purpose of illustration and explanation, and are not to be taken as limiting the scope of the present invention. The scope of the present invention is to be determined by the appended claims. In the accompanying drawings, like reference numerals are used to denote like parts throughout the several views. It should be noted that each of the drawing is not always illustrated in a constant reduction scale, but includes an enlarged portion to show a principle of the invention.

DESCRIPTION OF EMBODIMENTS

Figure 1:
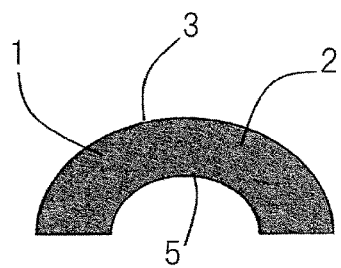
FIG. 1 is a schematic front view for explaining a concrete tile according to an embodiment of the present invention.

Hereinafter, embodiments of the present invention will be described with reference to the drawings. It should be noted that the present invention is not limited to the embodiments shown in the drawings.

Concrete Tile

A first configuration of the present invention is a concrete tile that includes a tile body. The tile body has a front surface hardened through non-mold shaping, a rear surface hardened through mold shaping, and a side surface.

Figure 2:
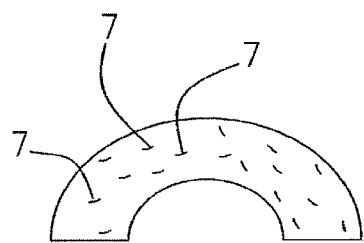
FIG. 2 is a schematic cross-sectional view for explaining the concrete tile shown in FIG. 1.

FIG. 1 is a schematic front view for explaining a concrete tile according to an embodiment of the present invention. FIG. 2 is a schematic cross-sectional view for explaining the concrete tile.

As shown in FIG. 1, the concrete tile includes a tile body 2 having a semi-cylindrical shape, and the tile body 2 has an upper face 3, a lower face 5, and a cut end face 1. The upper face 3 is a tile surface hardened through non-mold shaping. For example, the upper face 3 may be formed by compression using a shaping roller and a slipper. The lower face 5 is a tile surface hardened through mold shaping. For example, the lower face 5 may be formed by the use of a mold which is referred to as a pallet in the roller/slipper system.

The cut end face 1 formed by cutting during the manufacturing process of the concrete tile may have, in at least a part of the cut surface, a rough-surface shape caused by the cutting.

In more detail, the rough-surface shape is formed, for example, by press-cutting the molding material with a cutter having a blunt end. Such a rough-surface shape is made mainly as a result of aggregation of molding material being compressed at the cut face. It should be noted that the rough surface can be distinguished from the below-described protrusions due to the presence of a fiber-containing granular body by visual observation since the protrusions are not completely integrated with the surrounding molding material, and present as hardened bodies at least partially separated from the surrounding molding material by void spaces.

As shown in FIG. 2, the tile body includes alkali-resistant fibers 7 in its entire portion in a state substantially free of fiber-containing granular bodies including the alkali-resistant fiber 7. Here, "including the alkali-resistant fibers 7 in the entire portion" means a state where the alkali-resistant fibers are dispersed in the tile body throughout the entire thickness of the tile body. "A state substantially free of a fiber-containing granular body including the alkali-resistant fiber" means a state where a fiber-containing granular body having a circle equivalent diameter of not less than 10 mm, preferably not less than 5 mm, and in particular, not less than 3 mm cannot be observed at the cut face of the tile cut at a randomly-chosen position. Details of an evaluation method are described in below-described Examples.

In a case where the molding material filled in a pallet is press-cut with a cutter such as a below-described blade, the cutter may not necessarily have a sharp cutting edge. Therefore, there may be a case where an alkali-resistant fiber contained in the tile body is not cut but is pulled out from inside due to the pressure during press-cutting the molding material. In such a case, at least a part of the alkali-resistant fiber may be present on the cut surface.

The concrete tile of the first constitution contains the alkali-resistant fiber in the entire portion of the tile body in a specific dispersed state. Therefore, the concrete tile is excellent in flexural strength even though the tile has a light weight. The flexural strength of a cut piece of 30 mm×150 mm in size is not less than 6 N/mm$^2$, preferably, may be not less than 6.5 N/mm$^2$, and more preferably, may be not less than 7.5 N/mm$^2$. The upper limit of the strength is not limited in particular, but is normally 20 N/mm$^2$ in many cases. The flexural strength represents a value measured according to the method described in the below-described Example.

For example, the concrete tile can be usefully used as a light-weight concrete tile. For example, the weight of the tile may be not greater than 40 kg/m$^2$ (for example, 15 to 38 kg/m$^2$), and preferably not greater than 37 kg/m$^2$ (for example, 20 to 36 kg/m$^2$).

The weight of the concrete tile represents the weight per unit area of the concrete tile itself. Essentially, the value is calculated by obtaining the area and the weight per one tile, and dividing the weight by the area.

The concrete tile may have a protrusion caused by the aggregate inside the concrete, or a protrusion formed in accordance with a design. Preferably, the surface (for example, the upper face 3 and/or the lower face 5 of the tile body 2, preferably the upper face 3) of the tile body 2 does not have a protrusion due to the presence of a fiber-containing granular body composed of fibers assembled in a shape of spherule or the like. For evaluation of the presence or absence of the protrusions due to the presence of the fiber-containing granular bodies, the surface of the tile body excluding the cut face may be subjected to the evaluation so as to distinguish the above-described protrusions from protrusions of the rough surface shape.

The protrusion due to the presence of a fiber-containing granular body can be recognized by cutting the tile along a plane including a protrusion and examining if a fiber-containing granular body having a circle equivalent diameter of not less than 10 mm, preferably not less than 5 mm, in particular, not less than 3 mm exists in the protrusion. Here, a fiber-containing granular body is a hardened body that includes the fibers, that is not completely integrated with the surrounding molding material, and that is at least partially separated from the surrounding molding material by a void space. For example, the fiber-containing granular body may be composed of a fiber-containing lump including a fiber lump or fiber agglomerate forming a core, and cement, aggregate, or the like that are kneaded and integrated with the fibers. The circle equivalent diameter is the diameter of a circle having the same area as the projected area of the granule, and may be referred to as Heywood diameter. The surface of the tile body refers to the part that is designed to have no protruding portions.

As shown in the cross-sectional view in FIG. 2, the alkali-resistant fibers 7 are contained in the tile body throughout the entire thickness of the tile body such that the alkali-resistant fibers 7 are dispersed in a specific state substantially free of a fiber-containing granular body. For example, the alkali-resistant fibers inside the tile body may be dispersed randomly in the thickness direction, or may be dispersed with an oriented state in a specific direction. Randomly dispersed fiber and oriented fiber may coexist partially in the tile body. Preferably, the fibers are oriented in the advancing direction of the roller/slipper system so as to improve the flexural reinforcement of the tile.

The tile may have any shape known in the field. For example, the tile may have S-shape, cylindrical shape, semi-cylindrical shape, wave shape, F shape, flat shape, J shape, beaver shake, or the like. An appropriate shape may be selected depending on the use of the tile.

An overlapped portion (or coupled portion) to be overlapped with adjacent tile may be formed on a rim of the upper face of the tile in one side, an overlapping portion (or coupling portion) to overlap the adjacent tile may be formed on a rim of the lower face of the tile in the other side.

Figure 3:
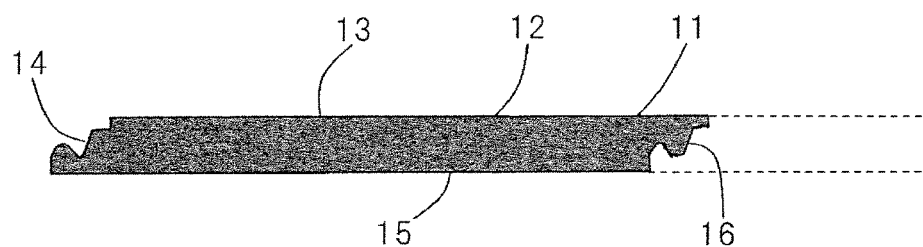
FIG. 3 is a schematic front view for explaining a concrete tile according to another embodiment of the present invention.

For example, FIG. 3 is a schematic front view for explaining a concrete tile having an F shape. This concrete tile has: a substantially rectangular tile body 12 having a cut end face 11 in at least one side; an overlapped portion 14 formed on an upper face 13 of the tile body 12; and an overlapping portion 16 formed on a lower face 15 of the tile body 12. The cut end face 11 formed during the manufacturing process of the concrete tile has a rough-surface shape caused by the cutting.

The overlapped portion 14 has a groove for engaging with the overlapping portion 16, and surface shape of the overlapping portion 16 is reversal to the surface shape of the grooved overlapped portion 14. In FIG. 3, an adjacent tile is indicated by dotted lines. The overlapped portion 14 may be overlapped with the overlapping portion 16 of the adjacent tile substantially without any gap therebetween. Here, "overlapping state substantially without any gap therebetween" means a state where the overlapped portion and the overlapping portion are engaged with each other without a gap of 10 mm or greater therebetween. Details of an evaluation method are described in the below described Examples.

The concrete tile of the first constitution of the present invention is preferably excellent in strength, and preferably passes the EN490 standard in a tile bending test performed in accordance with EN491:2011. In this case, "pass a tile bending test" means that, in the case of a plate tile, tile strength is not less than 1200 N (preferably not less than 1500 N, and more preferably not less than 1800 N) in a load test performed in accordance with EN491:2011. The upper limit in the tile bending test is not particularly limited, but is about 4000 N in many cases. Here, the numerical values obtained in the tile bending test indicate the values measured according to the method described in below described Example.

The concrete tile is excellent in strength, and thus, can be thinned. For example, the thickness of the thinnest part in the tile body may be about 8 to 100 mm, preferably about 10 to 95 mm, and more preferably about 15 to 90 mm.

Since the concrete tile can maintain strength even where the tile has thin thickness, it is not necessary that the concrete tile has small specific gravity as that of concrete. Therefore, for example, the specific gravity of the concrete tile of the present invention may be about 1.5 to 2.2, preferably about 1.6 to 2.1, and more preferably about 1.7 to 2.0. It should be noted that the specific gravity represents a comparative weight of a material of 1 cubic centimeter in volume shown by a ratio to the weight of water of 1 cubic centimeter in volume at 4° C. where the weight of 1 cubic centimeter of water at 4° C. is defined as "1".

Preferably, the concrete tile is excellent in tenacity, and preferably is not substantially split-broken in a falling ball test performed in reference to JIS A 1408. Here, the expression "is not substantially split-broken" means that the tile is not completely broken and does not split into two or more large pieces (where a volume of at least one piece is 20% to 80% of the volume of the entire tile before the breakage). That is, surface fracture due to cracking and loss of small pieces caused by surface chipping are not considered as a state where the tile is split-broken substantially.

Method for Manufacturing Concrete Tile

In a method for manufacturing a concrete tile according to another constitution of the present invention, a concrete tile can be manufactured from a predetermined molding material by using a roller/slipper system. Specifically, the manufacturing method includes:

supplying a molding material to a hopper of a roller/slipper-type extruder;

filling the molding material supplied from a lower portion of the hopper into a plurality of pallets adjacent to each other;

compressing the filled molding material by using a roller and a slipper to form a band-shaped body continuously placed on the pallets adjacent to each other; and cutting the band-shaped body with a cutting blade to form individual raw tiles on individual pallets, respectively.

For example, a method for manufacturing a concrete tile according to an embodiment of the present invention will be described with reference to FIG. 4. An extruder used in the roller/slipper system includes: a hopper H for supplying a material; a hydraulic cylinder C for pushing out pallets P; a roller R for extruding the material downward from the hopper H and for compressing the material onto the pallets; and a slipper S for further compressing the material extruded by the roller R.

Figure 4:
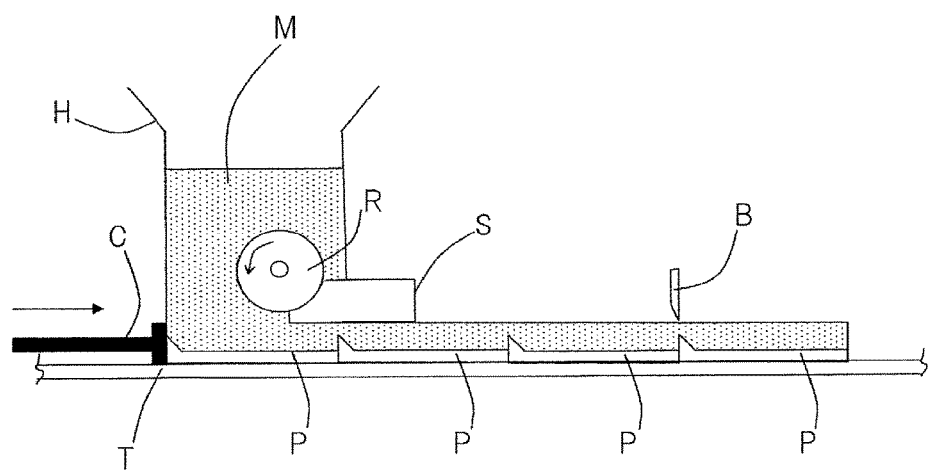
FIG. 4 is a schematic diagram for explaining a method for manufacturing a concrete tile according to an embodiment of the present invention.

As shown in FIG. 4, first, a molding material M for manufacturing a concrete tile is supplied to the hopper H. Below the hopper H, the pallets P . . . P each serving as a mold of a tile rear surface (tile lower face) shape are arranged forming a row, and these pallets are slid and moved on a table T. The table T has guides on the bottom surface and the side surfaces for moving a series of the pallets P . . . P. The extruder is provided with the hydraulic cylinder C for pushing out the pallets P . . . P which are the molds for the tile rear surface shape and are arranged forming a row. When the hydraulic cylinder C reaches the end position of stroke, the hydraulic cylinder C stops once, and then, moves in the direction opposite to the arrow direction in order to return to the initial position.

Through the action in the arrow direction, the hydraulic cylinder C pushes each pallet P downstream from the hopper side as the upstream side. Then, in accordance with the movement of the pallet P, the molding material M is extruded from a lower portion of the hopper H, and filled in the pallet P while being made flat by the use of the roller R and the slipper S. In more detail, for example, the molding material in the hopper H is filled into the pallet P due to the own weight, and rotation of the roller R in the arrow direction, and the like. The molding material M filled in the pallet P is made flat by the roller R and the slipper S, whereby a tile front surface (or tile upper face) is formed. Where necessary, the hopper H may houses an extruding unit (for example, a paddle or the like) for extruding the molding material M in the direction of pallet.

On the surface of each of the pallets P, the roller R, and/or the slipper S that are to be in contact with the molding material M may be designed to include projections/recesses. The projections/recesses may constitute a tile shape, shapes of coupled (coupling) portion, shapes of non-coupled portion, and pattern on the tile surface or the like.

The tile is cured and hardened, while being in contact with the pallet P with the lower surface. Therefore, the tile has a surface hardened through molding. On the other hand, the upper face of the tile is formed while being compressed by the roller R and/or the slipper S. Since the shaping is performed without using a mold, the upper face has a surface hardened through non-mold shaping. The surface hardened through mold shaping tends to be a smooth surface caused by the shape of the mold.

Then, the pallet P filled with the molding material M is moved to the downstream side of the hopper H by the action of the hydraulic cylinder C, forming a band-shaped body continuously placed on the pallets adjacent to each other. Then, the pallets P are respectively cut at the front end and the back end thereof by a blade B provided on the downstream side, whereby individual raw tiles are formed on the individual pallets, respectively. These raw tiles are further cured under a predetermined condition, whereby the raw tiles are hardened and the tiles each having a predetermined shape can be obtained. When the tile is cut by the blade B, a rough surface caused by the cutting is usually formed on the cut end faces of each tile.

A method for manufacturing a concrete tile according to another embodiment of the present invention will be described with reference to FIG. 5. In this embodiment, instead of the table T shown in FIG. 4, a conveyor C is provided below the hopper H, the conveyor C being provided with the pallets P . . . P forming a row, each pallet P serving as a mold for providing a tile rear surface shape.

The conveyor C moves toward the downstream side from the hopper at the upstream side. In accordance with its movement, the molding material M is extruded, and filled and compressed in the pallet P while being made flat by the roller R and the slipper S. In more detail, for example, the molding material in the hopper H is filled into the pallet P due to the weight of the molding material itself, rotation in the arrow direction of the roller R, and the like, and the molding material M extruded into the pallet P is made flat by the roller R and the slipper S, whereby a tile upper surface is formed.

Figure 5:
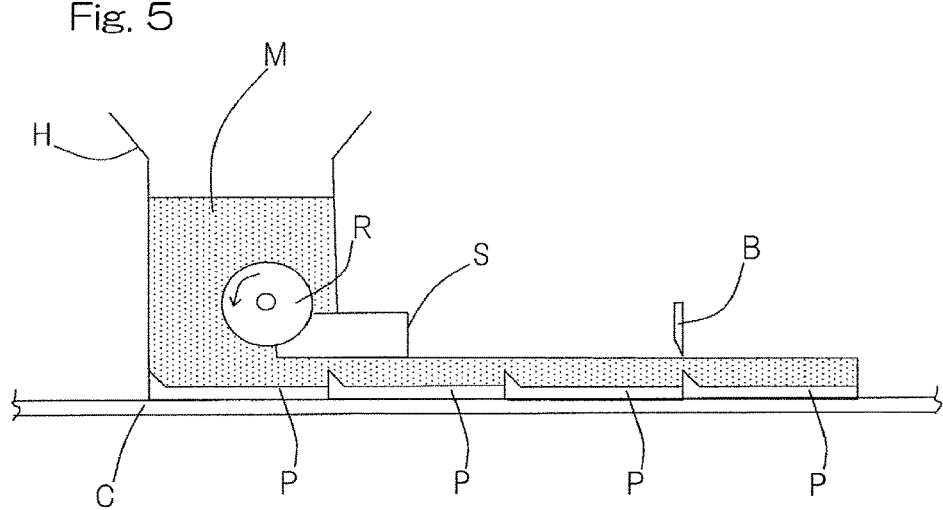
FIG. 5 is a schematic diagram for explaining a method for manufacturing a concrete tile according to another embodiment of the present invention.

Although not shown in FIG. 5, the conveyor may be moved by use of various kinds of drivers that are used in the technical field. For example, the conveyor may be movable by drivers such as a motor or the like.

Further, as long as the pallets are movable, moving mechanism of the pallets is not particularly limited. It is possible to use a device other than the above-explained moving device to move the pallet.

Concrete Tile Molding Material

A molding material for manufacturing a concrete tile according to another constitution of the present invention includes at least a cement, an aggregate, an alkali-resistant fiber, and water, and the water cement ratio (W/C) may be, in percentage by mass, about 20 to 50%, preferably may be 20 to 45% (for example, 35 to 45%), and more preferably 20 to 40% (for example, 35 to 40%). The alkali-resistant fiber is not substantially present as a fiber-containing granular body in the molding material. The substantial absence of a fiber-containing granular body formed of the alkali-resistant fiber in the molding material can be confirmed by the fact that a fiber-containing granular body having a circle equivalent diameter of not less than 10 mm, preferably not less than 5 mm, and in particular, not less than 3 mm cannot be observed at a cut face formed by cutting the tile at a randomly selected position. Details of an evaluation method are described in below-described Examples.

The proportion of the alkali-resistant fiber relative to the solid content in the molding material may be about 0.1 to 2% by mass, preferably about 0.3 to 1.8% by mass, and more preferably about 0.5 to 1.6% by mass, so as to suppress formation of fiber-containing granular bodies.

In order to provide excellent kneadability and to mix the alkali-resistant fibers in the entire portion of the tile as a formed body, the alkali-resistant fibers used in the present invention may be at least one alkali-resistant organic fibers selected from the group consisting of polyvinyl alcohol (hereinafter also referred as PVA) fibers, polyolefin-based fibers (polyethylene fibers, polypropylene fibers, and the like), ultra high molecular weight polyethylene fibers, polyamide fibers (polyamide 6, polyamide 6,6, polyamide 6,10, and the like), aramid fibers (in particular, para-aramid fibers), and acrylic fibers.

Such fibers are useful for manufacturing the above-described concrete tile. Among these, PVA fibers are particularly preferable because of the following reasons. PVA fibers can be advantageously used because of the concrete reinforcing property and low production cost. In addition, PVA fibers have excellent adhessibility to cement.

The alkali-resistant fibers may have aspect ratios of 50 to 1000 so as to suppress formation of fiber-containing granular bodies. Preferably, the aspect ratios of the alkali-resistant fibers may be about 70 to about 900, more preferably about 100 to about 800, so as to provide a predetermined strength to the tile. Here, the aspect ratio denotes a ratio of fiber length (L) to fiber diameter (D).

The strength of the tile as a whole can be enhanced as the fiber has high strength. For example, the fiber strength may be not less than 8 cN/dtex, preferably not less than 9 cN/dtex, and more preferably not less than 10 cN/dtex. The upper limit of the fiber strength is not particularly limited, and can be set to an appropriate value depending on the selection of fiber. For example, the upper limit of the fiber strength may be about 30 DcN/dtex. The fiber strength denotes a value measured according to the method described in the below-described Examples.

In order to suppress formation of fiber-containing granular bodies, to enhance mixability of fibers, and to enhance the strength of molded article, the alkali-resistant fibers to be admixed into the molding material may have an average diameter of about 1 to 200 μm, preferably about 2 to 150 μm, and more preferably about 5 to 100 μm.

Such a fiber can be selected arbitrarily and used by a skilled person in the art as long as the formation of fiber-containing granular bodies in the molding material is suppressed. In many cases, the fiber is used as short cut fibers formed by cutting a fiber bundle. The short cut fibers easily form fiber-agglomerates during cutting the fiber, during compressing the fiber into a fiber bale, and the like. Although the fiber bale may be preliminarily roughly disentangled by using a bale opener or the like, fiber-agglomerates tend to remain in many cases.

Where fiber-agglomerate are present in the molding material, there are cases where the aggregate and the cement containing water cover the fiber-agglomerates, thereby preventing the water and the cement from entering inside the fiber-agglomerates. In such a case, fiber-containing granular bodies mainly composed of fiber-agglomerates are formed not only in the molding material but also in the concrete tile.

Where necessary, it is possible to disperse fibers during preparation of the concrete tile molding material so as to prevent formation of such fiber-containing granular bodies.

Examples of the cement include: portland cements such as ordinary portland cements, high early strength portland cements, ultra-high early strength portland cements, and moderate heat portland cements; aluminous cements; blast furnace cements; silica cements; and fly ash cements. It is possible to use single type cement selected from these examples or two or more types in combination.

Fine aggregates used in manufacture of the concrete tile may be aggregates having a particle size of not greater than 5 mm. Examples of the fine aggregates may include: sands having a particle size of not greater than 5 mm; fine aggregates formed by powdering or granulating inorganic materials such as silica stone, fly ash, blast furnace slag, volcanic ash-based shirasu, various kinds of sludge, rocks or minerals; and the like. It is possible to use single type aggregate selected from these examples or two or more types in combination.

Examples of the sands include river sand, mountain sand, sea sand, crushed sand, silica sand, slag, glass sand, iron sand, ash sand, calcium carbonate, artificial sand, and the like.

The molding material may be blended with a natural light-weight aggregate such as volcanic gravel, expanded slag, or cinder; or an artificial light-weight aggregate such as expanded pearlstone, expanded perlite, expanded obsidian, vermiculite, or shirasu balloon. Since the concrete tile of the present invention can maintain strength even where the tile has a small thickness, it is possible to reduce the amount of the light-weight aggregate that is easily crushed during the manufacture of the concrete tile, and to reduce the weight of the concrete tile of the present invention at the same time. Therefore, the proportion of the amount of the light-weight aggregate in the amount of the aggregate can be reduced to not greater than 10%, and preferably not greater than 5%.

In addition to the fine aggregate, a functional aggregate may be added. Here, examples of the functional aggregate include colored aggregates, hard aggregates, elastic aggregates, and aggregates having specific shapes, and the functional aggregate may be a phyllosilicate (for example, mica, talc, kaolin), alumina, silica, or the like. The proportion of the functional aggregate relative to the fine aggregate can be set at an appropriate value depending on the selected material. For example, the mass ratio of the fine aggregate to the functional aggregate may be (fine aggregate)/(functional aggregate)=about 99/1 to about 70/30, preferably about 98/2 to about 75/25, and more preferably about 97/3 to about 80/20.

Among these functional aggregates, phyllosilicate is preferably added. The flake diameter of the phyllosilicate may be, for example, about 10 to 800 μm, and preferably about 20 to 700 μm.

For example, mica is a kind of phyllosilicate and is mainly composed of $SiO_2$, $Al_2O_3$, $K_2O$, and crystal water. Examples of preferable mica include muscovite, phlogopite, and the like.

The weight average flake diameter of the phyllosilicate may be, for example, about 50 to 800 μm, and preferably 100 to 700 μm. The weight average flake diameter indicates a value obtained by sieving the phyllosilicates using standard sieves of different mesh sizes, plotting the result of sieving on a Rosin-Rammlar chart, thereby determining a mesh size through which 50% by weight of the phyllosilicate subjected to the measurement passes, and multiply the determined mesh size by square root (that is, the length of diagonal of square mesh).

By mutual reinforcement by the combined use of the phyllosilicate with the alkali-resistant fiber, it is possible to improve various strength properties of the concrete tile.

The proportion of the functional aggregate (in particular, phyllosilicate) relative to the alkali-resistant fiber can be set at an appropriate value depending on the selected species. For example, the mass ratio of the functional aggregate to the alkali-resistant fiber may be (functional aggregate salt)/(alkali-resistant fiber)=about 1/1 to 50/1, preferably about 2/1 to about 40/1, and more preferably about 3/1 to about 30/1.

The mass ratio of the total amount (S) of the aggregate to the cement (C) may be aggregate (S)/cement (C) ratio=about 1/10 to about 5/1, preferably about 1/8 to about 4/1, and more preferably about 1/6 to about 3/1.

The concrete tile molding material allows the fiber to be mixed therein at a small water cement ratio (W/C). Conventionally, where the fiber is mixed with a small water cement ratio (W/C), it has been impossible to enhance the strength of molded article by mixing the fiber homogeneously in the molding material due to the lack of fluidity of the material after the kneading. Even when an admixture is used, fluidity of the material is poorer than that of concrete or mortar obtained for ordinary cast molding, and thus, it is difficult to uniformly mix the fibers in the molding material.

Where necessary, various kinds of admixture may be mixed in the concrete tile molding material, where the admixture may be selected from AE agents, superplasticizing agents, water reducing agents, high-range water reducing agents, AE water reducing agents, high-range AE water reducing agents, thickening agents, water retention agents, water-repellent agents, expanding agents, accelerators, retarding agents, and polymer emulsions [acrylic emulsion, ethylene-vinyl acetate emulsion, or SBR (styrene-butadiene-rubber) emulsion], for example. It is possible to use single species or combination of two or more species selected from the above-described admixtures. The polymer emulsion can enhance the adhesion between the components in the molding material in addition to the effect of reducing brittleness of the tile. Further, by combining the polymer emulsion, it is possible to retard excessive drying while improving waterproof performance of the tile.

The concrete tile molding material can be obtained by mixing the above-described cement, the aggregate, the alkali-resistant fibers, water, and the like in a range that allows to prevent the alkali-resistant fibers from substantially occurring as fiber-containing granular bodies in the molding material.

Preferably, preparation process of the molding material may at least include a process of dispersing the alkali-resistant fibers in a mixture including cement, aggregate, and water, such that the alkali-resistant fibers are not substantially present as a fiber-containing granular body.

It is sufficient if the mixture at least includes cement, aggregate, and water. Each of the cement, aggregate, and water may be contained in the mixture with an entire or a partial amount compared with the designated amount contained in the molding material. Where a partial amount is contained in the mixture, residual amount may be added in the time of dispersing the alkali-resistant fibers in the mixture and/or after dispersing the alkali-resistant fibers.

More preferably, the preparation process may include at least, mixing at least cement, aggregate, and water to form a mixture; and adding the alkali-resistant fiber in the mixture and dispersing the alkali-resistant in the mixture in a state substantially free of fiber-containing granular body.

For example, it is acceptable that at least the cement, the aggregate and water are mixed during the mixing. For example, the cement and the aggregate may be mixed in a dry process, and subsequently, the dry mixture may be kneaded with water added afterwards.

The fibers may be dispersed by various methods as long as the molding material substantially free of fiber-containing granular bodies including the alkali-resistant fibers can be obtained.

In the dispersing process, in order to improve dispersibility of the fibers, for example, (i) the alkali-resistant fibers may be supplied in a constant amount, (ii) disentangled alkali-resistant fibers may be added, or (iii) a mixer or a kneader having high stirring performance may be used to mix the alkali-resistant fiber. It is possible to apply one ways of (i) to (iii), or combine two or more ways selected from (i) to (iii).

Where the alkali-resistant fiber is supplied in a constant amount, the manner of supplying is not particularly limited as long as the fiber can be added continuously in the range of a predetermined amount. For example, various types of constant-amount-supplying devices (for example, vibrating feeder, screw feeder, belt feeder, and the like) can be used as a device that supplies the fibers while controlling the amount and/or speed of adding the fibers.

Where the alkali-resistant fibers are disentangled, the fiber-agglomerate can be disentangled into smaller fiber assemblies by use of predetermined disentangling device to an extent that allows to suppress occurrence of the fiber-containing granular bodies in the molding material. From the viewpoint of maintaining the fiber strength, it is preferable that disentangling of the fiber-agglomerate is performed such that fibrillation and crush of the fiber do not occur.

Usually, the fiber-agglomerate can be disentangled according to various methods using a dry process. For example, the fiber-agglomerate (a fiber bale, roughly disentangled fibers obtained from a fiber bale, a short cut fiber bundle, and the like) may be disentangled by causing a roll having projections to claw the fibers, by causing the fibers to pass between rotating gears opposed to each other, by use of shearing force of a rotating disk having grooves, or by impact caused by air blow. It is possible to perform a single method or two or more methods selected from the above-described disentangling methods. For example, the fiber-agglomerate (e.g., a lump of short cut fibers cut to have a predetermined length) may be disentangled in a dry process, thereby separated from each other.

In a case where a mixer or a kneader having high stirring performance is used in mixing the alkali-resistant fiber, a dual arm kneader, a pressure kneader, an Eirich mixer, a super mixer, a planetary mixer, a Banbury mixer, a continuous mixer, a continuous kneader, or the like can be used as the mixer or the kneader having high stirring performance, for example.

The concrete tile molding material obtained in this manner is then supplied to a hopper of the roller/slipper-type extruder, whereby the concrete tile can be manufactured through the roller/slipper system.

EXAMPLES

Hereafter, the present invention will be described in detail with reference to a Synthesis Example, Examples, and Comparative Examples. However, the present invention is not limited to these Examples.

[Method for Measuring Fiber Strength (eN/dtex)]

Evaluation was performed in accordance with JIS L1015 "Test methods for man-made staple fibres (8.5.1)".

[Method for Measuring Tile Weight (Kg/m$^2$)]

With respect to 5 tiles, the weight and the projected area from the upper face of each tile were measured. Then, sum of the areas of the respective tiles and the sum of the weight of respective tiles were calculated, and then, the obtained total weight is divided by the obtained total area, to calculate the tile weight (kg/m$^2$).

[Evaluation of Appearance of Tile Body]

Presence/Absence of Protrusion Caused by Fiber-Containing Granular Body in Surface Part of Tile With respect to the upper face of the tile body, the presence/absence of a protrusion caused by a fiber-containing granular body is examined by visual observation. When a protrusion is present, the tile is cut along a plane including the protrusion. Then, when a fiber-containing granular body having a circle equivalent diameter of not less than 10 mm is present in the protrusion, it is determined that the protrusion is derived from a fiber-containing granular body. Tiles were qualified as bad (C) where at least one fiber-containing granular body having a circle equivalent diameter of not less than 10 mm was found, acceptable (B) where at least one fiber-containing granular body having a circle equivalent diameter of not less than 3 mm and less than 10 mm was found; and good (A) where circle equivalent diameters of the fiber-containing granular bodies were less than 3 mm. Randomly selected 10 tiles are subjected to the examination of protrusion, and the tiles are evaluated to have protrusions where the protrusion was observed in at least one tile.

Presence/Absence of Fiber-Containing Granular Body Inside the Tile

After cutting a tile at a randomly selected portion, the cut face was subjected to visual observation if a fiber-containing granular body having a circle equivalent diameter of not less than 10 mm existed. Tiles were qualified as bad (C) where at least one fiber-containing granular body having a circle equivalent diameter of not less than 10 mm was found, acceptable (B) where at least one fiber-containing granular body having a circle equivalent diameter of not less than 3 mm and less than 10 mm was found; and good (A) where circle equivalent diameters of the fiber-containing granular bodies were less than 3 mm. Randomly selected 10 tiles are subjected to the examination of fiber-containing granular bodies, and the tiles are evaluated to have protrusions where at least one tile shows an existence of the fiber-containing granular body.

The fiber-containing granular body can be recognized by visual observation since it is not integrated with surrounding molding material and occurs as a hardened body separated from the surrounding molding material via a void space in between possibly due to its origin from fiber-agglomerate.

Engagement State in Overlapped Portion

The overlapping portion was placed on the overlapped portion, and overlapping state of the two portions was observed through visual observation. Where the two portions are engaged with each other without a gap of 10 mm or more therebetween, the state was evaluated as engagement substantially without a gap. The state of the overlapped portion was evaluated as good (A) where a groove was formed uniformly, acceptable (B) where the groove was not divided but had non-uniform height, and bad (C) where the groove was not formed partially. Randomly selected 10 tiles were subjected to observation of the overlapped portions to examine the overlapping state, and the tiles were evaluated as forming gaps where at least one of the overlapped portion showed an engagement with a gap.

[Measuring of Flexural Strength of Cut Piece]

Three strip-shaped test pieces each having a length of about 150 mm and a width of about 50 mm were cut out from each tile. In order to control the moisture content of the test piece constant at the time of measurement, the cut out test pieces were dried for 72 hours at 40° C. using a drier. The flexural strength was measured in accordance with JIS A 1408, using Autograph AG5000-B manufactured by Shimadzu Corporation, where test speed (crosshead speed with load) was 2 mm/minute, load was applied at center, and bending span was 100 mm.

[Measurement of Tile Bending Load]

In accordance with EN491:2011, a tile bending test was performed at a test speed (crosshead speed with load) of 500 N/minute. The bending load value obtained through this test was checked against the EN490 standard, to determine whether the tile has passed or not.

[Falling Ball Test on Tile]

With reference to JIS A 1408, a falling ball test was performed under the conditions of opposite sides simply supported, span of 200 mm, ball mass of 1.05 kg, and drop height of 30 cm. Three pieces were tested for each one group. Where at least one piece was substantially split-broken, the whole group was evaluated as non-acceptable. Here, "not substantially split-broken" means that the tile is not completely broken and split into two or more large pieces (the volume of each obtained piece is not less than 20% of the volume of the entire tile before the breakage). Therefore, the concept expressed by "not substantially split-broken" excludes loss of small pieces caused by surface fracture due to cracking and chipping of the surface.

[Method for Measuring Average Fiber Diameter and Aspect Ratio]

In accordance with JIS L1015 "Test methods for man-made staple fibres (8.5.1)", the average fiber length was calculated and the aspect ratio of the fiber was evaluated on the basis of the ratio of the average fiber length to the average fiber diameter. To determine the average fiber diameter, single-fibers were taken out at random one by one, and the fiber diameter at a center portion in the length direction of the fiber was measured using an optical microscope. Then, the average of measured diameters of 100 fibers was defined as the average fiber diameter.

[Specific Gravity of Tile]

3 strip-shaped test pieces each having a length of about 150 mm and a width of about 50 mm were cut out from each tile. Then, by measuring the dimensions of each test piece, the volume of each test piece was calculated. Then, each cut-out piece was dried for 24 hours at 100° C. in a drier, and the mass of each cut-out piece was separately measured. Then, the specific gravity of each cut-out piece was calculated by the following formula, then the average value was calculated, and the obtained average value was defined as the specific gravity of the tile.

$$\text{Specific gravity (g/cm}^3\text{)} = \text{mass of cut-out piece (g)} / \text{volume of cut-out piece (length} \times \text{width} \times \text{height) (cm}^3\text{)}$$

Examples 1 to 3

An ordinary portland cement (33.3 parts by mass), sea sand (63.2 parts by mass) as a fine aggregate S1, mica (weight average flake diameter: 300 μm, 2.5 parts by mass) as a functional aggregate S2 were mixed, and dry-blended for 1 minute using a 100-L volume planetary mixer. Then, water was added to the mixture, and the resultant mixture was kneaded for 1 minute, whereby a cement mixture having water cement ratio (W/C) of 38% by mass and aggregate (S)/cement (C) ratio=2/1 was obtained. After that, each kind of the fibers shown in Table 1 was added at the corresponding proportion shown in Table 1, and the resultant mixture was kneaded for 2 minutes, whereby a concrete tile molding material was obtained. Each of the fibers has been disentangled preliminarily by passing between rotating gears provided opposed to each other.

The molding material was loaded to the hopper of the roller/slipper-type extruder, and the material was extruded onto metal pallets for plain tile. Then, the material was compressed by a slipper, whereby the molding material was filled in the pallets. Then, each pallet was cut at the front end and the back end thereof with a cutting blade, to manufacture a plain tile having dimensions of 422 mm×333 mm×about 10 mm. These tiles were placed in a curing tank, and were hardened at 50° C. and RH 100% for 18 hours. After the hardening, the tiles were taken out of the metal pallets, and were further cured at 20° C. and RH 85% for 29 days. The characteristics of the obtained tiles are shown in Table 1.

Example 4

Concrete tiles were obtained in the same manner as in Example 1 except that the added amount of the fiber was 0.5 wt %. The characteristics of the obtained tiles are shown in Table 1.

Comparative Example 1

Concrete tiles were obtained in the same manner as in Example 1 except that no fiber was used. The characteristics of the obtained tiles are shown in table 1.

Comparative Example 2

Concrete tiles were obtained in the same manner as in Example 1 except that, as the aggregate, 15 mass % of the fine aggregate was replaced with E-SPHERES which is a light-weight aggregate manufactured by Taiheiyo Cement Corporation, and no fiber was used. The characteristics of the obtained tiles are shown in table 1.

Comparative Examples 3 to 4

Concrete tiles were obtained in the same manner as in Example 1 except that the kind and the added amount of the fibers were changed as shown in table 1. The features of the obtained tiles are shown in Table 1.

Comparative Example 5

Concrete tiles were obtained in the same manner as in Example 1 except that the fibers were not disentangled in advance. The features of the obtained tiles are shown in Table 1.

TABLE 1

| | Fiber | Disentangled | Strength cN/dtex | Fiber diameter μm | Aspect ratio | Added amount wt % | Specific gravity | Flexural strength* N/mm$^2$ |
|---|---|---|---|---|---|---|---|---|
| Example 1 | PVA1 | yes | 14 | 7 | 571 | 1 | 1.85 | 10 |
| Example 2 | PVA2 | yes | 12 | 26 | 231 | 1 | 1.83 | 9 |
| Example 3 | PP | yes | 10.5 | 14 | 429 | 1 | 1.84 | 7 |
| Example 4 | PVA1 | yes | 14 | 7 | 571 | 0.5 | 1.86 | 8 |
| Comparative Example 1 | — | — | — | — | — | — | 1.83 | 5 |
| Comparative Example 2 | — | — | — | — | — | — | 1.52 | 3.5 |
| Comparative Example 3 | PVA1 | yes | 14 | 7 | 571 | 2.2 | 1.73 | 5 |
| Comparative Example 4 | PVA3 | yes | 14 | 7 | 1143 | 1 | 1.75 | 5 |
| Comparative example 5 | PVA1 | no | 14 | 7 | 571 | 1 | 1.76 | 5.5 |

| | Falling ball test JISA1408 | Appearance | | | Tile weight kg/m$^2$ | Tile bending test EN490 |
|---|---|---|---|---|---|---|
| | | Front surface | Inside | Overlapped portion | | |
| Example 1 | pass | A | A | A | 30 | pass |
| Example 2 | pass | A | A | A | 33 | pass |
| Example 3 | pass | A | A | A | 35 | pass |
| Example 4 | pass | A | A | A | 35 | pass |
| Comparative Example 1 | failure | A | A | A | 35 | failure |
| Comparative Example 2 | failure | A | A | A | 35 | failure |
| Comparative Example 3 | pass | C | C | C | 35 | failure |
| Comparative Example 4 | pass | C | C | C | 35 | failure |
| Comparative example 5 | pass | C | C | C | 35 | failure |

*"Flexural strength" was measured using cut-out pieces.

As shown in Table 1, in each of Examples 1 to 4, the fibers are dispersed in a state where the fiber does not exist as a fiber-containing granular body, and the tile is excellent in appearance and shows sufficient characteristics as a tile in any of the cut piece flexural strength test, the tile bending test, and the falling ball test. In addition, weight of the tile can be decreased while maintaining such a high strength.

On the other hand, in Comparative Example 1, since no fiber is included, satisfactory result was not obtained in any of cut piece flexural strength test, tile bending test, and the falling ball test.

In Comparative Example 2, the weight of the tile was reduced by the use of light-weight aggregate. However, since no fiber is included, satisfactory result was not obtained in any of the cut piece flexural strength test, the tile bending test, and the falling ball test.

Comparative Example 3 shows inferior appearance possibly due to formation of fiber-agglomerates inside the tile caused by excessive amount of fiber. In addition sufficient strength was not achieved in the cut piece flexural strength test and in the tile bending test.

Comparative Example 4 shows inferior appearance possibly due to formation of fiber-agglomerates inside the tile caused by too large aspect ratio of fiber. In addition sufficient strength was not achieved in the cut piece flexural strength test and in the tile bending test.

Comparative Example 5 shows inferior appearance due to the presence of fiber containing granular bodies. In addition, sufficient strength was not achieved in the cut piece flexural strength test and in the tile bending test.

INDUSTRIAL APPLICABILITY

The concrete tile of the present invention can be usefully used as various types of roof materials, and also can be used as a wall tile, a floor tile, or the like.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A concrete tile comprising a tile body,
wherein
the tile body has an upper face hardened through non-mold shaping, a lower face hardened through mold shaping, and a side surface that comprises a cut end face in at least one side of the tile body,
the tile body comprises alkali-resistant fibers in an entire thickness in a state such that the alkali-resistant fibers form fiber-containing granular bodies each having a circle equivalent diameter of less than 10 mm at a cut face of the tile which is cut at a randomly chosen position;
the alkali-resistant fibers comprise at least one member selected from the group consisting of polyvinyl alcohol-based fibers, polyethylene fibers, polypropylene fibers, acrylic fibers, and aramid fibers;
a flexural strength of a 30 mm×150 mm sized cut piece of the tile body is not less than 6 N/mm$^2$;
the alkali-resistant fibers have an aspect ratio of from 50 to 1000; and
the tile body is made from a molding material in which the alkali-resistant fibers are present in an amount of from 0.1 to 2% by mass relative to the solid content of the molding material, wherein the molding material further comprises an aggregate, and the aggregate comprises a light-weight aggregate in a proportion of not greater than 10% based on an amount of the aggregate.

2. The concrete tile according to claim 1, wherein
a surface of the tile body is substantially free of protrusions caused by presence of the fiber-containing granular bodies.

3. The concrete tile according to claim 1, wherein a specific gravity of the tile body is from 1.5 to 2.2.

4. The concrete tile according to claim 1, wherein an average diameter of the alkali-resistant fibers is from 1 to 200 µm.

5. The concrete tile according to claim 1, wherein the alkali-resistant fibers are polyvinyl alcohol-based fibers.

6. The concrete tile according to claim 1 that passes EN490 standard in a tile bending test performed in accordance with EN491:2011.

7. The concrete tile according to claim 1, wherein the tile body is not substantially split-broken in a falling ball test performed with reference to JIS A 1408.

8. A concrete tile molding material for manufacturing the concrete tile according to claim 1,
wherein
the concrete tile molding material comprises a cement, an aggregate, alkali-resistant fibers, and water, wherein the aggregate comprises a light-weight aggregate in a proportion of not greater than 10% based on an amount of the aggregate,
a water to cement ratio (W/C) is from 20 to 50 mass %,
the alkali-resistant fibers comprise at least one member selected from the group consisting of polyvinyl alcohol-based fibers, polyethylene fibers, polypropylene fibers, acrylic fibers, and aramid fibers,
a proportion of the alkali-resistant fibers in a solid content is from 0.1 to 2% by mass, and
the alkali-resistant fibers in the concrete tile molding material form fiber-containing granular bodies each having a circle equivalent diameter of less than 10 mm.

9. The concrete tile molding material according to claim 8, wherein an average diameter of the alkali-resistant fibers is from 1 to 200 µm.

10. The concrete tile molding material according to claim 8, further comprising a functional aggregate.

11. A method of manufacturing a concrete tile by a roller/slipper method, the method comprising:
supplying the molding material of claim 8 to a hopper of a roller/slipper-type extruder;
filling the molding material supplied from a lower portion of the hopper into a plurality of pallets adjacent to each other;
compressing the filled molding material by using a roller and a slipper to form a band-shaped body that is continuously placed on the pallets adjacent to each other; and
cutting the band-shaped body with a cutting blade to form individual raw tiles on individual pallets.

12. The method of manufacturing a concrete tile according to claim 11, wherein
the supplying of the molding material comprises a preparation of the molding material, and the preparation comprises dispersing the alkali-resistant fibers in a mixture comprising a cement, an aggregate, and water while avoiding substantial occurrence of the alkali-resistant fibers as a fiber-containing granular body.

13. The concrete tile according to claim 1, wherein the tile body comprises alkali-resistant fibers in an entire thickness in a state that the alkali-resistant fibers form fiber-containing granular bodies each having a circle equivalent diameter of less than 5 mm at the cut face of the tile cut at a randomly chosen position.

14. The concrete tile according to claim 1, wherein the tile body comprises alkali-resistant fibers in an entire thickness in a state that the alkali-resistant fibers form fiber-containing granular bodies each having a circle equivalent diameter of less than 3 mm at the cut face of the tile cut at a randomly chosen position.

15. The concrete tile according to claim 1, wherein the tile body comprises alkali-resistant fibers in an entire thickness in a state free of fiber-containing granular bodies.

16. The concrete tile according to claim 1, wherein the tile body is made from a molding material in which the alkali-resistant fibers are present in an amount of from 0.3 to 1.8% by mass relative to the solid content of the molding material.

17. The concrete tile according to claim 1, wherein the tile body is made from a molding material in which the alkali-resistant fibers are present in an amount of from 0.5 to 1.6% by mass relative to the solid content of the molding material.

* * * * *